Nov. 7, 1944.　　　　O. SASLAW　　　2,361,969
SELENIUM RECTIFIER
Filed July 16, 1943
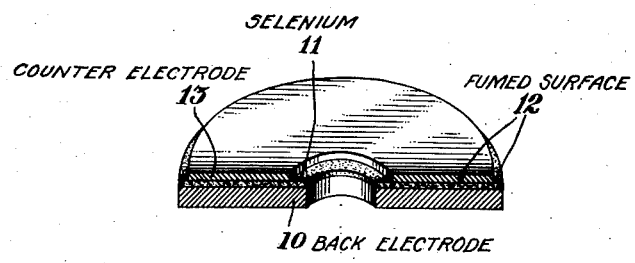
INVENTOR.
OTTO SASLAW
BY George J. Hyde
ATTORNEY Patented Nov. 7, 1944

2,361,969

UNITED STATES PATENT OFFICE 2,361,969

SELENIUM RECTIFIER

Otto Saslaw, Lyndhurst, N. J., assignor to Federal Telephone and Radio Corporation, New York, N. Y., a corporation of Delaware Application July 16, 1943, Serial No. 495,022

6 Claims. (Cl. 175—366)

This invention relates to selenium rectifiers and more particularly to an improved method of production and construction of selenium rectifier elements.

Such elements comprise a base plate or back electrode carrying a very thin layer of selenium covered by the counterelectrode; and the rectifying action is generally ascribed to the presence of a barrier or blocking layer at the surface of the selenium contiguous to the counterelectrode. In order to be commercially satisfactory the element must have adequate forward conductivity and very low reverse conductivity.

The general purpose of the invention is to improve the effectiveness of the blocking layer, and in particular to decrease the reverse conductivity without substantially affecting the forward conductivity. This is accomplished by exposing the selenium surface, prior to the application of the counterelectrode, to fumes of the type present over hot concentrated sulfuric acid. The precise action or reaction is not fully understood. Apparently it includes a reaction between the selenium and sulfur trioxide present in the fumes. Moreover, since a certain amount of water is present, some nascent selenium and selenium dioxide are formed on the surface of the selenium layer. The operation is controlled to prevent excessive attack on the very thin selenium layer by sulfur compounds.

In the preferred method of carrying out the invention the base plate or back electrode is coated with selenium in the usual manner and heat treated to obtain the desired crystalline form of the selenium. The disk is then placed over hot concentrated surfuric acid in a closed chamber for a period sufficient to obtain the maximum improvement in rectifying characteristics without damaging the selenium layer. The optimum time of exposure will vary in accordance with the concentration of the acid, the temperature to which the acid is heated, the proportion of water vapor and other elements present, the condition of the selenium layer and other factors; but the best time of exposure under any given conditions can readily be determined. In general, periods of exposure of between 5 and 30 seconds are effective.

The fumes vary both as to concentration and precise composition in accordance with the concentration of the sulfuric acid and the temperature to which it is heated. With sulfuric acid having a concentration of 97%, for instance, a temperature of at least 230° C. should be employed; whereas if the concentration is 99% or better the process will operate at temperatures of 200° C. and over. However, it is preferable to employ substantially high temperatures in order to obtain greater concentration of the fumes. In general, the acid should have a concentration of 95% or higher, commercial fuming sulfuric acid being satisfactory; and with such acid a temperature of about 200° C. has been found effective. Water vapor will necessarily be present in the fumes over the acid; but it has been found that the process operates more satisfactorily if the relative humidity is not above 50%.

After the fuming treatment the counter electrode is applied in the usual way and the element is electro-formed and otherwise treated in the usual manner.

The indicated treatment produces a selenium surface of distinctive character, having a forward conductivity comparable to that of similar selenium rectifier elements and a substantially lower reverse conductivity. Moreover, the process eliminates the necessity for employing high temperatures in treating the selenium surface after the crystalline selenium has been obtained, such for instance as those which have been used in other fuming processes.

While the preferred method of carrying out the invention has been described, it will be apparent that similar results can be obtained by variations of the process without departing from the scope of the invention as set forth in the claims. For instance, the effective fumes that are present above the sulfuric acid may be produced in other ways.

Due to the extreme thinness of the selenium layer and the proportionately smaller depth of the zone affected by the process, the exact nature of the treated surface, although distinctive, cannot be accurately described directly. It is however, characteristic of selenium surfaces treated by the above described method.

The selenium element produced by the method embodying the invention is illustrated in the drawing which consists of a diagrammatic cross section through a rectifier disk including the usual iron or aluminum back electrode 10 carrying a thin coating of selenium 11 having a fumed surface 12 treated to form a blocking layer and covered by the counterelectrode 13, which may be of Wood's metal or the like.

What is claimed is:

1. A method of preparing selenium rectifier elements having a selenium layer mounted on a base plate which comprises exposing the surface of the selenium layer to fumes of the type present immediately above hot concentrated sulfuric acid, applying a counter-electrode to the fumed surface and electro-forming the element.

2. A method as set forth in claim 1, in which the selenium surface is exposed to the fumes above hot sulfuric acid having a concentration not less than 95%.

3. A method as set forth in claim 1, in which the selenium surface is exposed to the fumes for a period between 5 and 30 seconds.

4. A method of preparing selenium rectifier elements having a selenium layer mounted on a base plate which comprises reacting the surface of the selenium layer with sulfur trioxide, applying a counterelectrode to the reacted surface and electro-forming the element.

5. A method of preparing selenium rectifier elements having a selenium layer mounted on a base plate which comprises exposing the surface of the selenium layer to the fumes above hot concentrated sulfuric acid, applying a counter-electrode to the fumed surface and electro-forming the element.

6. A selenium rectifier element comprising a back electrode, a front electrode and a layer of selenium between the electrodes having a surface of the type produced by exposure to fumes from concentrated sulfuric acid.

OTTO SASLAW.